United States Patent
Roblin et al.

[15] 3,706,492
[45] Dec. 19, 1972

[54] PHOTOELECTRIC SYSTEM AND METHOD FOR DETECTING THE LONGITUDINAL LOCATION OF SURFACES

[72] Inventors: Gerard Roblin, Ivry; Georges Nomarski, Bourg La Reine, both of France

[73] Assignee: Agence Nationale de Valorisation de la Recherch (ANVAR), Courbeuoie, France

[22] Filed: Dec. 2, 1970

[21] Appl. No.: 94,473

[30] Foreign Application Priority Data

Dec. 5, 1969 France..............................6942108

[52] U.S. Cl. .....................356/5, 350/12, 356/108, 356/111, 250/201
[51] Int. Cl. ..............................................G01b 9/02
[58] Field of Search ........250/204, 225, 201; 350/12, 350/5; 356/106, 108, 111, 113, 5

[56] References Cited

UNITED STATES PATENTS

| | | | |
|---|---|---|---|
| 2,973,686 | 3/1961 | Dreyfus et al. | 250/225 |
| 3,319,515 | 5/1967 | Flournoy | 356/108 |
| 3,558,210 | 1/1971 | Smith | 350/12 |

OTHER PUBLICATIONS

"Spiral Interphako Incident-Light Interference Microscope," Beyer, Jena Review, 4-1971, pp. 82–88.

Primary Examiner—Benjamin A. Borchelt
Assistant Examiner—S. C. Buczinski
Attorney—Littlepage, Quaintance, Wray & Aisenberg

[57] ABSTRACT

A method and an arrangement enabling the location of a plane or spherical, specularly reflecting or diffusing surface. The method comprises alternately modulating the "tube" or total length of the instrument in such a manner as to create a focusing error alternating with respect to that plane of the image which would correspond to perfect focus without modulation a variable photoelectric signal is provided by a photoreceiver which is subject to variations in light flux transmitted by an interferogram disposed in the portion common to the two waves in the plane of the pupil. An error signal produced by the treatment of the photoelectric signal is used to control the displacement of the objective or the object along the optical axis in order to focus or calculate the focusing error. The method and arrangement are useful especially in the field of metrology.

6 Claims, 12 Drawing Figures

Inventors
Gérard Roblin & Georges Nomarski
By
Littlepage, Quaintance, Wray & Aisenberg
Attys Inventors
Gérard Roblin & Georges Nomarski
By Littlepage, Quaintance, Wray & Aisenberg
Attys Inventors
Gérard Roblin & Georges Nomarski
By Littlepage, Quaintance, Wray & Aisenberg
Attys

PHOTOELECTRIC SYSTEM AND METHOD FOR DETECTING THE LONGITUDINAL LOCATION OF SURFACES

BACKGROUND OF THE INVENTION

The present invention relates to a method for discovering the longitudinal, i.e., in depth, location of diffusing or specularly reflecting planar surfaces or of the centers of reflecting spherical surfaces.

The invention also relates to an arrangement for carrying out this method which particularly enables the automatic focusing on a surface of an optical microscope or finder, the recording of the shape or profile of a surface, the measurement of the distances between surfaces, etc.

In industry or the laboratory the needs of metrology or of ordinary observation lead either to focusing of the lens of an optical instrument on a surface or to locating in depth the surface of an object with respect to a reference fixed to the object itself or to its environment. The operation is carried out with the aid of sensors or feelers, either mechanical, which therefore come into physical contact with the object, or electrical or optical, which do not come into physical contact with the object.

Feelers of the first type have the disadvantage that, by coming into contact with the object they can cause a deformation of said object. The choice of the pressure to be exerted and the radius of curvature of the feeler requires consideration of the hardness of the material and its roughness.

Feelers or sensors of the second type do not cause deformations of the object, but the feelers are deformed. Electric feelers, whose operation is based on the variation of an electrical capacity, require that one of the capacitor armatures be connected to the object itself. By using the surface itself, only variations in the position of the surface can be detected and not the location of said surface. On the other hand, only the mean position of a plane having a surface equal to the area of the armatures can be located unless one armature is solidly placed with respect to the object through a mechanical feeler. On the contrary, the optical feelers referred to herein have not only the advantage of feeling the surfaces without physical contact but that of being adapted to operate on objects with variable surfaces, in particular of very slight surface, and with variable roughness.

The simplest and oldest known method (See FIG. 1), consists of projecting through an objective $O_b$, and onto the surface to be located, the image $R'_o$ of a lighted reticle $R_o$ conjugate to a reticle $R1$ relative to a glass plate separator G. The image $R''_o$ of $R'_o$ is only conjugate to reticle R relative to the objective Ob when $R'_o$ coincides with the surface A (also with its center of curvature in the case of a non-planar surface A). By means of the eye-piece $O_c$, the operator focuses the instrument on the surface A with an absence of parallax. The precision of this pointing or locating operation is limited by the characteristics of the instrument on one hand and by the physiological qualities of the eye of the operator on the other hand. The focusing thus effected is therefore subject to human individual errors, which requires that a plurality of operators carry out a large number of observations as is done in the conventional optical procedure for measuring radii of curvature and focal distances.

Another known method is based on the equality of contrasts of images of two Foucault patterns placed symmetrically on both sides of the focusing place. The precision of this method is limited by the threshold of perceptable contrast by the eye of the operator. The illumination of two images of two aperture sources disposed on both sides of the focusing plane are compared. The precision is acceptable but the field of the instrument is limited. This is also the case with respect to another process using the Foucault knife method in longitudinal locations and causing a photometric equalization (as in the two preceding methods) not in the plane of the image given by the objective of the finder, but in the plane of its pupil.

Indeed, if an objective $O_b$ (See FIG. 2) is considered which is assumed to be perfect, and, in particular to obey Herschell's condition, it is known that, in this case a focusing error of $dx'=SoSl$ at the image point corresponds to a focusing error at the object point of $dx = AB$. Between the surfaces of the emerging spherical waves respectively centered at $So$ and $Sl$, a delay $\Delta = \alpha'^2(dx'/)$ is effected where $\alpha$ is the image aperture angle of the objective. Variations in focusing can thus be revealed as well from the variations of $dx'$ as from variations of $\Delta$, i.e., from deformations of the wave front.

SUMMARY OF THE INVENTION

The object of the present invention is to provide a method for revealing deformations in the wave surface in the plane of the pupil through its differentiated profile obtained by interferometry of two waves surfaces due to angular or lateral duplication of the pupil.

The method of the invention therefore consists in carrying out the angular or lateral duplication by means of a birefringent wave duplicator. The "tube" or total length of the instrument is modulated alternately so as to create an alternating focusing error with respect to the image plane which would correspond to perfect focusing without modulation. A variable photoelectric signal is provided by a photoreceiver which is subject to variations in light flux transmitted by an interferogram positioned in the portion common to the two waves in the plane of the pupil. An error signal produced by processing this photoelectric signal is used for controlling the displacement of the objective or of the object along the optical axis to effect the focusing or to calculate the focusing error.

From the situation of perfect focusing of the instrument, the variation in the absolute value of the delay $\Delta$ in the plane of the pupil is the same for a given focusing error $dx'$ irrespective of its sign. Therefore, on both sides of the true focusing plane, a sinusoidal modulation of the focusing error $dx'$ with an amplitude $X'_0$ and a frequency f causes, in the plane of the pupil, a periodical variation of illumination of frequency 2f. Contrarily, if the objective of the instrument is not focused on the point of the surface to be viewed, it follows that a focusing error which is fixed in direction and magnitude, is added to the focusing error at the modulated point, with the result that an optical path difference, fixed in sign and magnitude, is added to the modulated optical path difference, and the illumination of the interferogram in the plane of the pupil no longer varies symmetrically on both sides of the origin of the modulation, and thus the photoelectric signal comprises a frequency component $f$ whose amplitude can constitute an error signal.

The apparatus for carrying out the method according to the invention preferably constitutes a photoelectric pick-up device adapted to discover longitudinal locations comprising: an object forming a light source illuminating an adjustable diaphragm disposed in the image plane of an objective; a crystalline wave duplicator operating by refraction disposed between crossed polarizers and duplicating by angular or lateral duplication the supposed exit pupil of the objective in the rear focal plane of the objective with possible adjustment of the dimensions of the pupil and the value of the duplication; a device for alternately modulating a focusing error; a receiver photosensitive to the illuminations due to the interferogram of the two wave surfaces in the plane of the duplicated pupil, and means activated by the receiver for determining or adjusting the location of the object with respect to the objective. The apparatus of the preferred embodiment essentially comprises: a light source providing, through an appropriate condensor means, a light beam passing through a polarizer, then a polarizing interferometer which includes either one or more Wollaston prisms or derivatives of a Wollaston prism, and possibly a λ/4 plate oriented at 45° from the Wollaston axes; an aplanetic objective fully corrected for geometric and chromatic aberrations in the image plane of which are positioned the interference fringes from the interferometer; an adjustable aperture diaphragm and a field diaphragm, with the diaphrgms or their images being placed in the image plane of the objective and in the plane of its exit pupil respectively, reflecting onto the object, and passing again through the objective, the interferometer reflecting onto a mirror which is moved by an alternating movement enabling the modulation of the tube length, or traversing another modulating system enabling an analogous result, possibly reflected onto a semi-transparent optical plate which is traversed by the incidental beam or conversely, passes through an analyzer in crossed relation with the polarizer before reaching a photosensitive receiver, the output of this receiver device being connected to any known means adapted to put the signal in form, by its synchronous detection, and the production of an error signal to enable the automatic focusing of the instrument or the control of the displacement of the objective in function of the displacement of the object or conversely.

BRIEF DESCRIPTION OF THE DRAWINGS

The method and the device according to the invention are described hereinbelow with reference to the accompanying drawings in which.

DESCRIPTION OF THE PREFERRED EMBODIMENTS

Reference will first be made to FIGS. 3-6.

Figure 1:
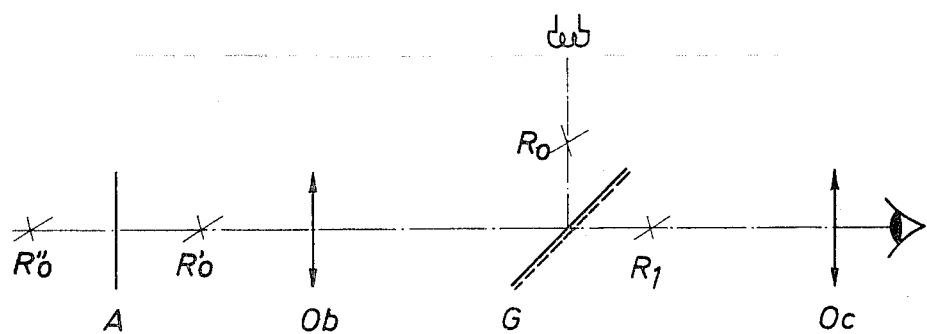
FIGS. 1 and 2 describe systems discussed above.
Figure 2:
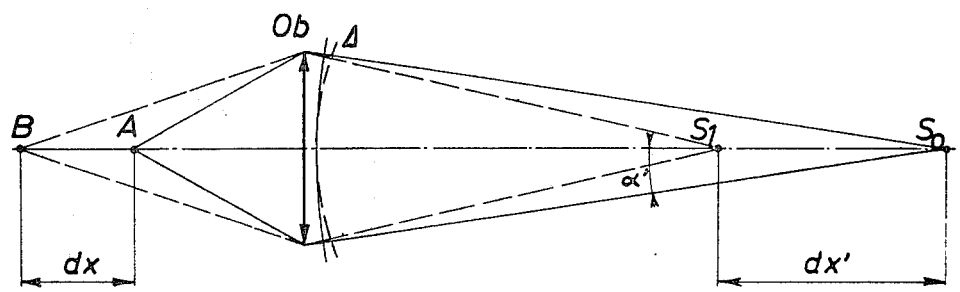
Figure 3:
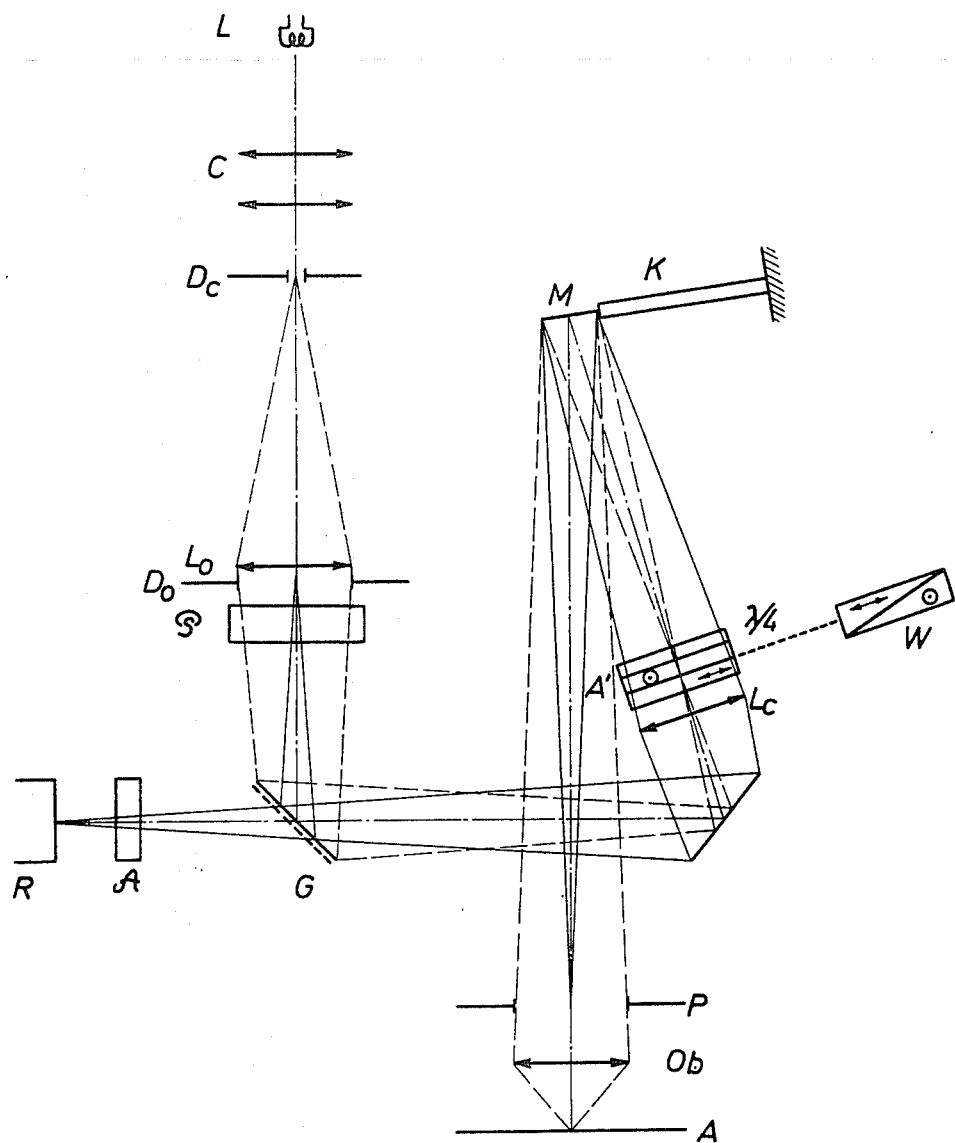
FIG. 3 shows a device constructed to enable the modulation of a focusing error of the duplication of the pupil and of the photoelectric detection of the interferogram.
Figure 4:
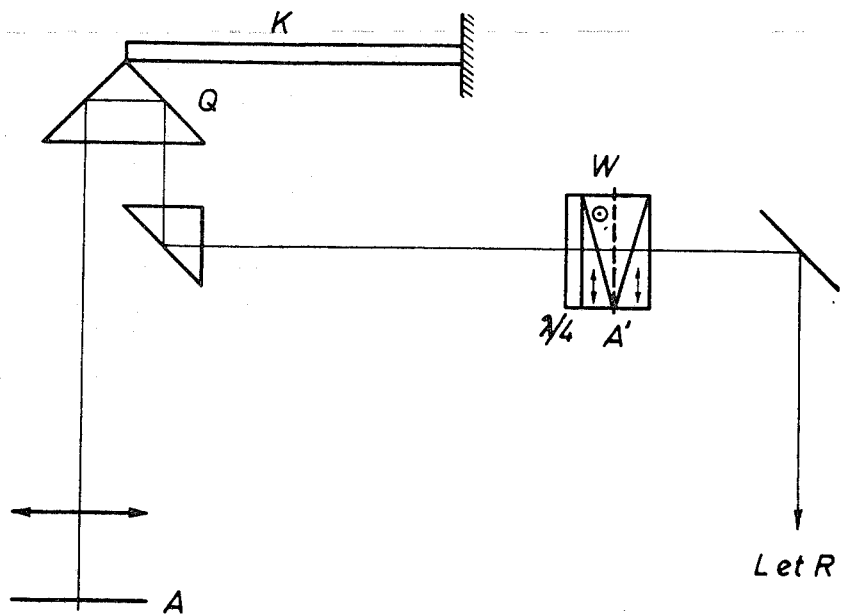
FIG. 4 shows a modification of the reflection modulator of FIG. 3.

An objective Ob (FIG. 3) is shown which operates on a couple of planes A (object) and A'(image). A double refractive prism W of the Wollaston type for example, is placed in the intermediary image plane A'. A mirror M is placed between the pupil P of the objective and the intermediary image plane A' and serves to modulate the "tube" or total length of the apparatus. In order to do this it undergoes a sinusoidal oscillatory movement with an amplitude $X'_o$ and a frequency f. This movement can be produced by a known method, for instance in the example represented, the mirror is fixed to a piezoelectric ceramic bar K embedded at one of its ends. Other known electrodynamic or electromagnetic methods can be used to fix the mirror, for example, onto a piezoelectric ceramic tube or an electromagnetic coil. Through a condenser C the light from the source L illuminates a field diaphragm $D_c$ and an aperture L diaphragm $D_o$ which are conjugate to A' and P due to the optical units L $_o$ and $L_c$. This light is polarized by a polarizer τ oriented at 45° from the axes of the Wollaston prism. In the embodiment of the FIG. 3, the ceramic (piezoelectric element) K causes a slight off axis shift of the beam. In order not to cause any disturbance in the interferogram studied, it is necessary to orient said Wollaston prism so that its edge (i.e., its own interference fringe pattern) is parallel to the plane in which said off axis shift is effected. To prevent this disturbance it is still possible to solidly connect to the vibrating piezoelectric element K a mirror Q shaped as a rectangular dihedron, so that the reflected beam remains parallel to the incident beam (FIG. 4). The light beam, after being reflected onto the object A' and having again traversed the objective Ob and the interferometer W, reaches the photosensitive receiver R after being passed through the semi-transparent plate G and an analyzer A crossed with respect to the polarizer τ.

In the absence of a focusing error (FIG. 5a), the interferometer W divides the beam into two perpendicularly polarized beams, viz, an extraordinary beam E and an ordinary beam O. The exit pupil P of the objective is divided into two pupils, extraordinary $P_E$ and ordinary $P_O$, and the wave having its center at point A' is divided into two waves, extraordinary $\Sigma_E$ and ordinary $\Sigma_O$ also centered at A'. Assuming that the plane of the exit pupil P of the objective coincides with the rear focal plane of the objective so that the image which the unit constituted by the objective and which the image object plane furnishes for P, becomes formed in the plane P and assuming furthermore that the objective $O_b$ is perfect and the pair of points A and A' is stigmatic, then the waves $\Sigma_E$ and $\Sigma_o$ are spherical.

Because the interferometer W is lodged between crossed polarizers, and if the point A' is considered as a point source, the two waves are coherent with respect to one another and can interfere in their common portion of duplication. Because the interferences are subtractive, and if it is assumed that the objective is perfect, a dull dark tint is observed in the common portion of duplication. In this case the photosensitive receiver R is subjected to a theoretically nil and practically minimal flux. The illumination of the common portion is not completely nil because of the quality of the optical elements. Polarizers in particular, and the photoreceiver also possibly receive the flux corresponding to the non-common portions of the wave surfaces. It should be noted that this reasoning holds under the assumption that there is a single point in the field which was illuminated. Actually, the phase displacement due to the double refraction at a point of the Wollaston prism is proportional to the distance from this point to the center. However, in the arrangement such as shown in FIG. 3 the prism is itself conjugate with an enlargement +1 relative to the system consisting of the objective Ob and the plane mirror constituting the object A. Each of the points of finite field thus provides its own interferogram, and the combination of said interferograms blur the figure observed in the common zone of duplication. To remedy this fault, a λ/4 plate is disposed between the interferometer and the pupil, whereby said plate is oriented at 45° from the axes of the Wollaston prism and furthermore after having traversed twice is equivalent to a plate λ/2, thus transforming the extraordinary beam into an ordinary beam and vice versa. Accordingly, self-compensation of the interferometer occurs, which latter can therefore work with a source of white light, and a finite field can be used in the case when the object is a plane mirror.

When a focusing error occurs (FIG. 5b), the image point A' is no longer in the plane of the interferometer W and the image is therefore divided into two images, viz, extraordinary $A'_E$ and ordinary $A'_O$. In a first approximation it is assumed again that the wave surfaces centered at these points are spherical. The interferogram located in the common zone of duplication of the pupil is similar to that obtained with two Young apertures $A'_E$ and $A'_O$. In the common zone, there thus appears a pattern of interference fringes with two sinusoidal waves, which are rectilinear in a first approximation, the central interference fringe being achronomatic. If $\epsilon$ is the duplication angle of the Wollaston prism and $dx'$ is the focusing error, the distance between $A'_E$ and $A'_O$ is $\epsilon\, dx'$. If D is the distance from the pupil of the objective to the plane of the image (extension) the interference spacing in the common duplication zone is $i = \lambda D/\epsilon dx$, where $\lambda$ is the wave length of the light used. The duplication L in the plane of the pupil being equal to $D\epsilon$, along the width $B=2R-L$ of the common width there are a number of interference fringes $k$ such that $l = ki$, either $k = l/i = (2R-L/i) = (2R - D\epsilon/\lambda D) = \epsilon\, dx'$, or $k = (2\, \alpha'\, \epsilon - \epsilon^2/\lambda)\, dx' = (2RL-L^2/D^2)\, (dx'/\lambda)$, where R is the radius of the pupil of the objective and $\alpha'$ its numerical image aperture. Assuming that the objective is that of a 10X microscope and has a numerical aperture 0.25, the radius of its exit pupil is equal to 4 mm and its extension is equal to 160 mm. When it is assumed further that the duplication of the interferometer has been so selected that the dimension of the common zone is the radius of the exit pupil of the objective, which namely corresponds to a maximum number of interference fringes in the common zone, all things being equal moreover i.e. $l = 4$ mm if it is assumed that the modulating mirror has a vibration amplitude $X'_o = 0.1$ mm, that yields a maximum focusing error $dx'_o$ equal to 0.2mm (value absolute) the number of interference fringes introduced by the modulation therefore being at maximum:

$$k_o = R^2 dx'_o/D^2\, \lambda = 16 \times 0.2/160^2 \times 0.5 \cdot 10^{-3} = 6400/160^2 = \tfrac{1}{4}$$

The light flux which passes through the common duplication zone and to which the receiver is finally subjected is $$\Phi = \int_\sigma E(u)\, d\sigma,$$

$E(u)$ being the distribution of the illumination in this common zone and $\sigma$ its surface area. Thus, as $E(u) = E_o \sin^2(\pi u/i)$:

$$\Phi = \int_\sigma E(u)\, du\, dv = 2E_o \int_0^{l/2} \sin^2 \frac{\pi u}{i} \left[ \int_{-\sqrt{R^2 - (u - R + \tfrac{1}{2})^2}}^{\sqrt{R^2 - (u - R + \tfrac{1}{2})^2}} dv \right] du$$

In the preceding example and taking into account that in said example $\sin^2(\pi u/i)$ can be equated to $\pi^2 u^2/i^2$ since $\pi u/i$ is equal to a maximum at $\pi/8$, the light flux in the absence of a focusing error is modulated between 0 and $2E_o(R^4/i^2) = E/50$ lumens, if $E_o$ is expressed in phots (wherein the phot is the egs unit of illumination equal to one lumen per square centimeter) when the modulating mirror causes a focusing error comprised between 0 and $\pm\, dx'_o$. It is therefore seen that there is an interest of having the greatest number of fringes in the common zone, i.e. an interference spacing as small as possible in order that the rate of modulation be the greatest. It is nevertheless necessary that said number of fringes be less than 1 because if the modulation accompanying the focusing error to be detected causes the creation of a plurality of fringes, it introduces a parasite modulation, the flux in the common portion oscillating about the value $E_o\, \sigma/2$, value obtained each time that the dimension $l$ of the common zone is equal to an entire number of fringes.

When considering the optimum example where the duplication in the plane of the pupil is equal to the radius of the latter:

$$\phi(dx') = 2E_o(R^4/i^2) = 2E_o\, k^2 R^2 = 2E_o\, R^2 (\epsilon 4/\lambda^2)\, dx'^2$$

When there is a focusing error $\Delta x$ of the object which corresponds to a focusing error $\Delta x'$ of the image point, then $dx' = \Delta x' + dx'_o \sin 2\pi ft = \Delta x' + 2 X'_o \sin 2\pi ft$ The photoelectric signal proportional to the light flux is therefore such that:

$$S(t) = Mdx'^2 = M[\Delta x'^2 + 4\Delta x' X'_o \sin 2\pi ft + 4X'^2_o \sin^2 2\pi ft]$$

$$S(t) = M[\alpha x'^2 + 2X'^2_o + 4\Delta x' X'_o \sin 2\pi ft - 2X'^2_o \cos 4\pi ft]$$

where M is a constant depending on the characteristics of the instrument. In the presence of a focusing error, the photoelectric signal thus provides an error signal equal to $4MX'\Delta x'$, amplitude of the component of the signal at the modulation frequency of the mirror.

Figure 6:
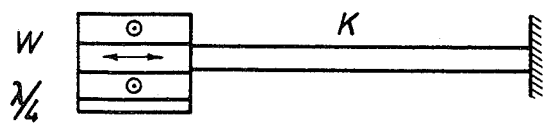
FIG. 6 shows an alternative modulator not operating by reflection.
Figure 5A:
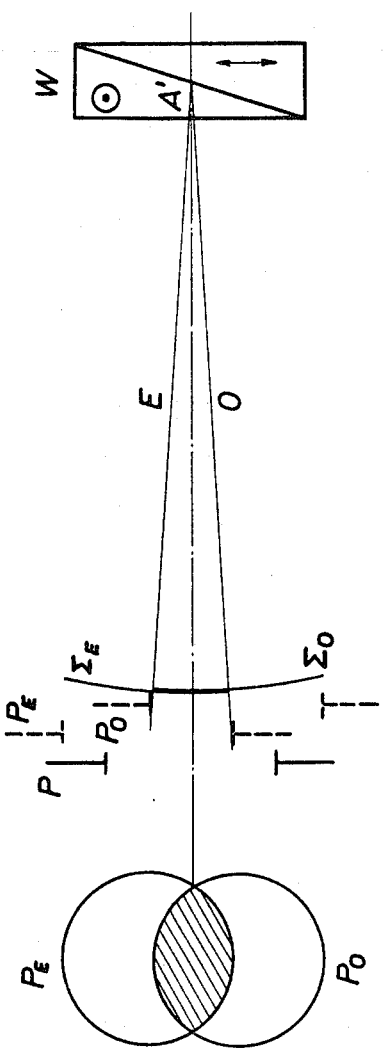
FIG. 5a shows a schematic diagram explaining the duplication of the pupil in the absence of a focusing error.
Figure 5B:
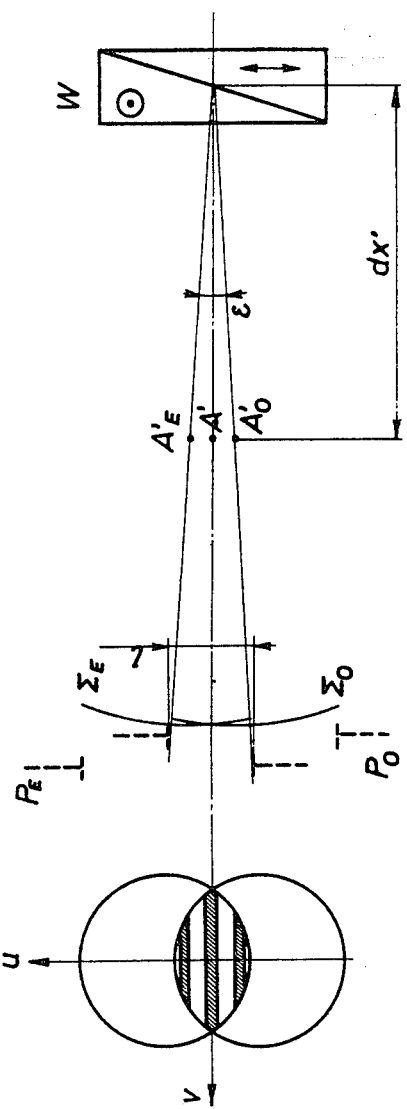
FIG. 5b shows a schematic diagram explaining the duplication of the pupil when focusing error exists.

It must be noted that modulation of the distance between the plane of the image and the interferometer, is equivalent to modulation of the position of the plane of the image with respect to the interferometer or conversely. A method as shown in FIG. 6 can therefore be employed, in which the interferometer is fixed to the vibrating element. In FIGS. 4 and 6 the interferometer shown is a derivative of the Wollaston prism, which is preferably used for the large duplications requiring a large prism angle because it presents a fringe pattern perpendicular to the optical axis. In the case of the example chosen supra, for example, the duplication $\epsilon = \lambda/D = 4/160$ would necessitate a Wollaston prism of quartz having an angle next to 54°.

Figure 7:
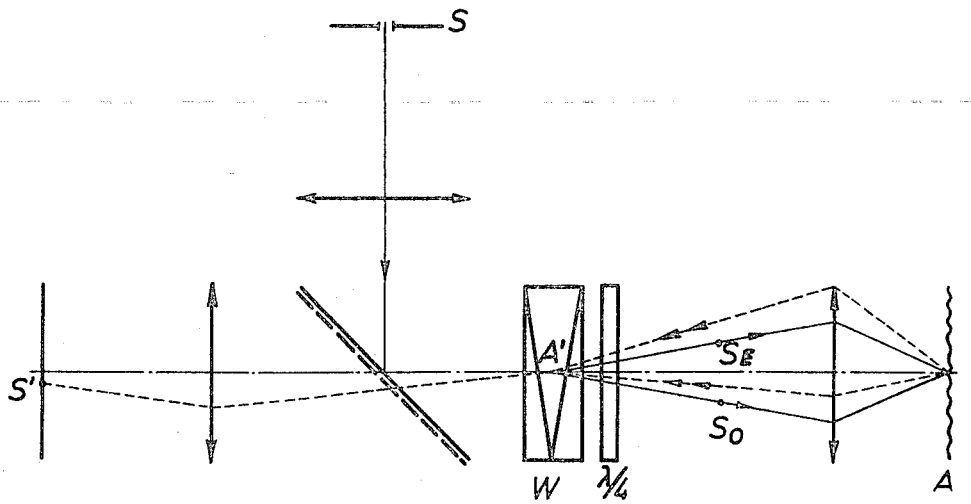
FIG. 7 shows means enabling the location of the diffusing surfaces.

The presence of a variable field diaphragm $D_c$ enables one to limit to a greater or lesser extent the dimensions of the field, as a function of the precision that is desired regarding the location of the plane of the object (mean location of this plane or very precise location of a point). It is also seen that it becomes possible to locate a point on the diffusing surface. The presence of a diaphragm $D_o$ with a variable opening enables one, for an interferometer having a given duplication $\epsilon$, to adjust the relation of the duplication L in the plane of the pupil with its radius R so as to act on the sensitivity of the instrument through the intermediary of the rate of modulation of the photoelectric signal. This also enables the elimination of the parasitic modulations which intervene when the value of the focusing error is such that it produces a number of fringes greater than 1 in the common duplication zone. This diaphragm further enables one to adapt the numerical aperture to the roughness of the object, and even at a limit, to locate a point on a non-specular but diffusing reflecting surface. There will be considered a pin-point source S (FIG. 7) conjugated with the pupil of the instrument. The interferometer W, which is also provided with a diaphragm, gives two pin-point images $S_E$ and $S_O$ at a single point. Because the object comprises a diffusing surface, the light covers the whole pupil at the return. It is possible to observe an interferogram in the plane of the pupil, since for each direction, the object being a pin-point, there are a couple of ordinary and extraordinary rays, shown alone in the figure.

Figure 8:
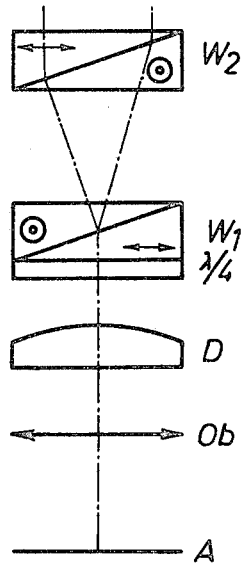
FIG. 8 represents an alternative device using a wave duplicator causing a lateral duplication and associated with an alternative modulator including a rotating cylindrical lens.

In this instrument the angular duplication interferometer can be replaced by a lateral duplication interferometer as shown in FIG. 8. The interferometer comprises two identical Wollaston prisms, or derivatives of Wollaston prisms, $W_1$ and $W_2$ having axes oriented according to the figure and producing a lateral duplication of the ordinary and extraordinary beams. In this case the fringe pattern of the interferometer is located at infinity and the self-compensation of the instrument, beyond using a $\lambda/4$ plate, requires that the objective Ob used operate for a point object situated at its focal point. In this case, the tube or total length of the optical system being infinite, it can no longer be modulated by reflector. A cylindrical lens D of low power and rotating at a frequency f in the plane of the exit pupil of the objective Ob or displaced according to a sinusoidal oscillating movement is used as a modulator. It is to be noted that with this arrangement, it is easy to form a variable duplication interferometer enabling adjustment of the sensitivity of the instrument while acting on the distance between the two Wollaston prisms.

A lateral shifting or displacement may further be realized by using a Savart polariscope where the duplication can be variable if it comprises two prisms capable of being translated with respect to one another and both constituting a lamina with parallel faces and of variable thickness.

Figure 9A:
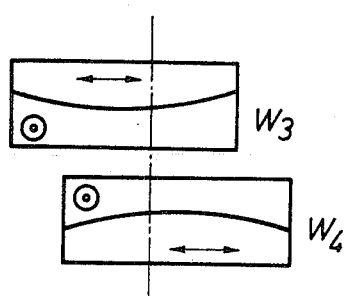
FIGS. 9a and 9b represent interferometer devices with adjustable duplication.

In each one of the proposed examples, at least one of the interferometers can be replaced by a double refracting duplicator with a variable duplication. FIG. 9a shows a possible solution to this problem. The interferometer in this case comprises two units $W_3$ and $W_4$ with plane parallel outer faces, each comprising a bound unit grouping a cylindrical lens or a plano-spherical convex lens and a cylindrical lens or a plano-spherical concave lens whose axes are crossed by translation of the two units with respect to one another in a direction perpendicular to the axis of the cylinders or parallel to one of the axes in the case of spherical surfaces. This arrangement is equivalent to a Wollaston prism with a variable angle and therefore provides a variable duplication.

Figure 9B:
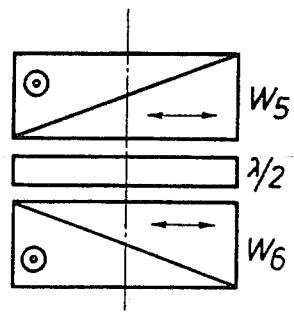

FIG. 9b represents another arrangement comprising two identical Wollaston prisms $W_5$ and $W_6$ placed symmetrically with respect to a $\lambda/2$ plate, oriented at 45° from the axes of said prisms. If, from this position, the two prisms are rotated in their planes through equal and opposite angles, an arrangement is obtained which is equivalent to a prism with a variable angle (i.e. an analogy to a diaspormeter), therefore producing a variable duplication.

Figure 10:
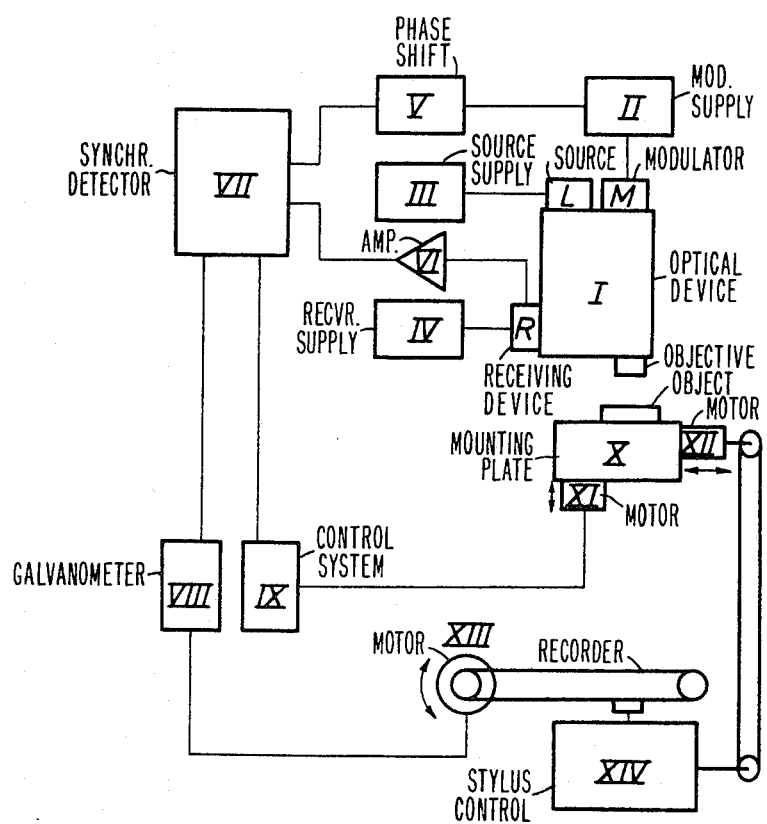
FIG. 10 is a block diagram illustrating examples of the application of the apparatus.

FIG. 10 shows several applications of the apparatus described above. The device I with the source L, the modulator M, the receiving device R and the objective Ob is intended to longitudinally locate the object A. The units II, III and IV are the sources for the modulator, for the source and for the receiving device respectively. Preferably, in order to avoid parasitic modulations, the source is fed by direct voltage, but it could also be fed with periodic voltage at the modulation frequency. The modulation frequency is in general the resonance frequency of the modulator in order to obtain a modulation with a true frequency, and a minimum of noise and expenditure of energy. The signal emitted by the modulator is introduced into a synchronous detector VII, in order to be mixed and compared with the photoelectric signal emitted by the receiving device and previously amplified by the amplifier VI. These two signals are in phase because of the phase shifter or regulator V. The preceding concerns the putting into form of the photoelectric signal and the detection of the error signal. Various uses can be made of this error signal. The following can be cited as non-limiting examples:

1. The error signal can be received and measured by means of a galvanometer VIII. It has been seen that the amplitude of the error signal is proportional to the focusing error.

2. The error signal can be delivered to a control system IX enabling by means of a motor XI the displacement of the mounting plate X carrying the object A so as to maintain the focus: this is an example of an automatic focusing. Instead of displacing the mounting plate, the objective could also be displaced, whereby the motor can comprise a cylindrical piezoelectric ceramic element or an electromagnetic coil.

3. If the mounting plate X receives a translatory movement perpendicular to the optical axis by means a motor XII, said motor can cause the rotation of the drum of a recording apparatus whose stylus is displaced by the motor XIII controlled by the error signal; one thus obtains a profilograph.

4. The association of three instruments of the type described herein and pre-regulated on a horizontal surface (mercury bath for example) can, by the intermediary of three motors XI acting on three adjusting screws of a mounting plate, assure the horizontal positioning of said mounting plate. The choice of the orientation of said plate is moreover not limited provided that a preadjustment of the devices has been carried out.

Each one of the positioning devices described hereinabove in 1–4 can also control the displacement of associated devices such as the tools of machine-tools for example.

The method and arrangement according to the invention can be applied or used at all times when the problem involved is to locate in depth of diffusing or specularly reflecting surfaces or centers of spherical reflecting surfaces, in industry as well as in laboratories.

Particularly interesting applications can be made in the automatic focusing of a microscope or optical finder on a surface, for the recording of the shape or profile of a surface, the measurement of the dimensions between surfaces and the like.

What we claim is:

1. In a focusing method for photoelectric detection of longitudinal locations by revealing deformations in a wave surface in the plane of a pupil by its differentiated shape obtained by interferometry of two wave surfaces due to duplication of the pupil of an instrument having a tube, this duplication being effected by means of a double refracting wave duplicator, the improved steps comprising: alternately modulating the tube of the instrument so as to create a focusing error alternating with respect to that plane of the image which would correspond to perfect focusing without modulation, creating a variable photoelectric signal by means of a photoreceiver responsive to variations in light flux transmitted by an interferometer located in a portion common to the two waves in the plane of the pupil, processing the photoelectric signal to obtain an error signal, and controlling the displacement between the objective and the object along the optical axis in response to said error signal to complete focusing.

2. A focusing system for photoelectric detection of longitudinal locations by revealing deformations in a wave surface in the plane of a pupil by its differentiated shape obtained by interferometry of two wave surfaces due to duplication of the pupil of an instrument, comprising:
  A. an object to be focused upon illuminated by a light source and disposed in an image plane of an objective,
  B. a crystalline wave duplicator operating by refraction and disposed between crossed polarizers to permit duplication of an exit pupil of the objective in a rear focal plane of the objective, thereby producing two waves having respective wave surfaces,
  C. means for alternately modulating a focusing error,
  D. a receiver photosensitive to illuminations due to the interference of the two wave surfaces in the plane of the duplicated pupil, and
  E. means activated by the receiver for determining or adjusting the location of the object with respect to the objective.

3. A system according to Claim 2 comprising: a light source providing, through an appropriate condensor means, a light beam passing through:
  A. a polarizer, then
  B. a polarizing interferometer which includes either one or more Wollaston prisms or derivatives of a Wollaston prism,
  C. said objective being aplanatic and fully corrected for geometric and chromatic aberrations in the image plane in which are positioned the interference fringes from the interferometer, and
  D. an adjustable aperture diaphragm and a field diaphragm, being effectively placed in the image plane of the objective and in the plane of its exit pupil respectively,
  E. the beam then reflecting onto the object and passing again through the objective,
  F. the beam then reflecting onto a mirror which is moved by an alternating movement enabling the modulation of the tube length,
  G. the beam then passing through an analyser in crossed relation with the polarizer before reaching,
  H. a photosensitive receiver, the output of this receiver device being connected to means adapted to put the signal in form for synchronous detection, thereby allowing the production of an error signal to enable automatic focusing by a displacement of at least the objective and of the object relatively to one another.

4. An arrangement according to claim 3 in which the error signal causes displacement of at least one of the objective and the object to focus the arrangement.

5. A focusing arrangement according to claim 3 wherein the interferometer is fixed to a vibrating element and is a derivative of a Wollaston prism, and is provided with its own interference fringe pattern perpendicular to the optical axis to be used in the large values of duplication requiring a large prism angle.

6. A focusing arrangement according to claim 3 further comprising a double refraction duplicator with variable duplication to function as at least one of the interferometers.

* * * * *

UNITED STATES PATENT OFFICE
CERTIFICATE OF CORRECTION

Patent No. 3,706,492                    Dated December 19, 1972

Inventor(s) Gerard Roblin and Georges Nomarski

It is certified that error appears in the above-identified patent and that said Letters Patent are hereby corrected as shown below:

In column 6 of the printed specification, the equation which runs from line 28 through line 35 should read as follows:

$$\phi = \int_\sigma E(u)\,du\,dv$$

$$= 2E_0 \int_0^{1/2} \sin^2 \frac{\pi u}{i} \left[ \int_{-\sqrt{R^2 - (u - R + \frac{1}{2})^2}}^{\sqrt{R^2 - (u - R + \frac{1}{2})^2}} dv \right] du$$

Signed and signed this 2nd day of October 1973.

(SEAL)
Attest:

EDWARD M. FLETCHER, JR.              RENE D. TEGTMEYER
Attesting Officer                    Acting Commissioner of Patents